United States Patent
Cox et al.

(10) Patent No.: US 7,769,732 B2
(45) Date of Patent: Aug. 3, 2010

(54) APPARATUS AND METHOD FOR STREAMLINING INDEX UPDATES IN A SHARED-NOTHING ARCHITECTURE

(75) Inventors: Philip S. Cox, Thornhill (CA); Leo T. M. Lau, Thornhill (CA); Adil M. Sardar, Markham (CA); David Tremaine, Markham (CA)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 11/845,608

(22) Filed: Aug. 27, 2007

(65) Prior Publication Data

US 2009/0063394 A1    Mar. 5, 2009

(51) Int. Cl.
*G06F 17/30* (2006.01)

(52) U.S. Cl. .................................... 707/696
(58) Field of Classification Search ............. 707/1, 707/2, 205, 696
See application file for complete search history.

(56) References Cited

U.S. PATENT DOCUMENTS

| | | | |
|---|---|---|---|
| 5,404,510 A * | 4/1995 | Smith et al. ............ 707/2 |
| 5,689,698 A | 11/1997 | Jones et al. |
| 5,857,180 A | 1/1999 | Hallmark et al. |
| 5,970,495 A | 10/1999 | Baru et al. |
| 5,983,213 A | 11/1999 | Nakano et al. |
| 6,144,970 A | 11/2000 | Bonner et al. |
| 6,609,131 B1 | 8/2003 | Zait et al. |
| 6,615,219 B1 | 9/2003 | Bruso et al. |
| 6,732,084 B1 | 5/2004 | Kabra et al. |
| 7,085,769 B1 | 8/2006 | Luo et al. |
| 7,225,444 B1 | 5/2007 | Yung et al. |
| 7,284,017 B2 | 10/2007 | Baune |
| 7,509,359 B1 | 3/2009 | Bruso et al. |
| 2004/0215640 A1 | 10/2004 | Bamford et al. |
| 2005/0055351 A1 | 3/2005 | Barton et al. |
| 2005/0086269 A1 | 4/2005 | Chen et al. |
| 2006/0004838 A1 | 1/2006 | Shodhan et al. |
| 2006/0041606 A1 * | 2/2006 | Sawdon ................ 707/205 |
| 2007/0260650 A1 | 11/2007 | Warner et al. |
| 2008/0155221 A1 | 6/2008 | Bireley et al. |
| 2009/0024578 A1 | 1/2009 | Wang et al. |

OTHER PUBLICATIONS

W. O'Connel et al., "A Teradata Content-Based Multimedia Object Manager for Massively Parallel Architectures", Int'l Conference on Management of Data, Montreal, Canada, pp. 68-78, 1996.

(Continued)

*Primary Examiner*—Etienne P LeRoux
(74) *Attorney, Agent, or Firm*—Kunzler Needham Massey & Thorpe

(57) ABSTRACT

An apparatus and method to streamline updates to an index in a shared-nothing architecture. The apparatus may include an association module, a consolidation module, and a processing module. The association module may associate index update requests with an index. The index update requests may be configured to update the index in response to a redistribution of data in a data table. The consolidation module may compile the index update requests prior to processing and consolidate the index update requests into a smaller number of simplified index update requests to achieve substantially the same result. The processing module may then independently process the simplified index update requests and update the index accordingly.

2 Claims, 2 Drawing Sheets

OTHER PUBLICATIONS

W. O'Connel et al., "A Teradata Content-Based Multimedia OBject Manager for Massively Parallel Architectures", Int'l Conference on Management of Data, Montreal, Canada, pp. 68-78, Jun. 1996.

Easy SQL, "If Record Exists, Update It. If Not, Insert It.", available online at disturbedbuddha.wordpress.com/2007/11/29/easy-sql-if-record-exists-update-it-if-not-insert-it/ (posted Nov. 29, 2007).

* cited by examiner

APPARATUS AND METHOD FOR STREAMLINING INDEX UPDATES IN A SHARED-NOTHING ARCHITECTURE

BACKGROUND OF THE INVENTION

1. Field of the Invention

The invention relates to indexing mechanisms for database management systems. Particularly, the invention relates to updating indexes for database tables in a shared-nothing architecture in response to redistribution of data in the table.

2. Description of the Related Art

As consumers have become more demanding in requiring quick and efficient service from businesses, companies have been quick to find ways to stay ahead of the competition. Business intelligence applications and technologies are one method by which companies may make more informed business decisions and cater to consumer needs and expectations. Such applications are used to analyze performance, projects, and/or internal operations, as well as to extrapolate information from indicators in the external environment to forecast future needs.

As business intelligence applications require an accumulation of data over time, adequate storage capacity is paramount to proper application performance. Shared-nothing architecture is a popular structure for such systems because of its scalability. This architecture enables support for very large databases by dividing the database into partitions that can be stored and managed on separate servers. Elapsed time for queries may also be drastically reduced by enabling individual queries to be processed in parallel.

Storage and processing power may be easily added to or removed from an existing shared-nothing architecture to meet present or projected future needs. Where physical machines are added or removed, data ownership must be changed and existing data redistributed. Data redistribution may also be required where existing data is not evenly distributed across physical hardware components, or does not meet business requirements.

Each database partition has local indexes on the data it stores, resulting in increased performance for local data access. A redistribution of data in a database table requires that indexes associated with the data be updated to reflect the changes. Known index maintenance solutions pair the data update process with the index update process, resulting in various processing inefficiencies. Specifically, such solutions serially process index updates as data changes occur, thereby interrupting data processing pending completion of such index updates.

From the foregoing discussion, it should be apparent that a need exists for a system and method to streamline index updates in shared-nothing architecture. Beneficially, such a system and method would reduce inefficiencies and costs traditionally associated with updating indexes in response to data changes and redistribution in a database table. Such a system and method are disclosed and claimed herein.

SUMMARY OF THE INVENTION

The present invention has been developed in response to the present state of the art, and in particular, in response to the problems and needs in the art that have not yet been met for updating indexes in a shared-nothing architecture. Accordingly, the present invention has been developed to provide an apparatus and method for updating indexes in a shared-nothing architecture that overcomes many or all of the above-discussed shortcomings in the art.

An apparatus to streamline updates to an index in a shared-nothing architecture in accordance with the present invention may include an association module, a consolidation module, and a processing module. The association module may associate index update requests with an index. The index update requests may be configured to update the index in response to a redistribution of data in a data table.

The consolidation module may compile the index update requests prior to processing. The consolidation module may further consolidate the index update requests into a smaller number of simplified index update requests that achieve substantially the same result as the larger number of index update requests. The processing module may then process the simplified index update requests independently of other data processing, and update the index accordingly.

In some embodiments, the index update requests may include an index key value and an index key code. The index key value may identify a data table record, while the index key code identifies a particular data table column. In one embodiment, the consolidation module orders each of the index update requests according to the index key code associated therewith. The processing module may then process the simplified index update requests in order from a most significant index key code to a least significant index key code.

In one embodiment, the simplified index update requests facilitate reuse of table space without requiring a full table scan. Such table space may result where a first index update request to add an index key code to the index and a second index update request to delete the index key code form the index have a same index key value.

A method of the present invention is also presented for updating an index associated with a data table in a shared-nothing architecture. In one embodiment, the method includes receiving index update requests to update an index in response to a redistribution of data in a data table. The index update requests may be associated with the index and compiled prior to processing. The index update requests may then be consolidated into a smaller number of simplified index update requests that achieve substantially the same result as the original index update requests. Finally, the simplified index update requests may be processed independently of other data to update the index.

In one embodiment, the method further includes ordering the index update requests from a most significant request to a least significant request prior to processing. In some embodiments, ordering the index update requests in this manner may be based on index key codes associated therewith.

In one embodiment, consolidating the index update requests includes facilitating reuse of table space without requiring a full table scan. As mentioned previously, such table space may result where a first index update request to add an index key code to the index and a second index update request to delete the index key code from the index have a same index key value.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
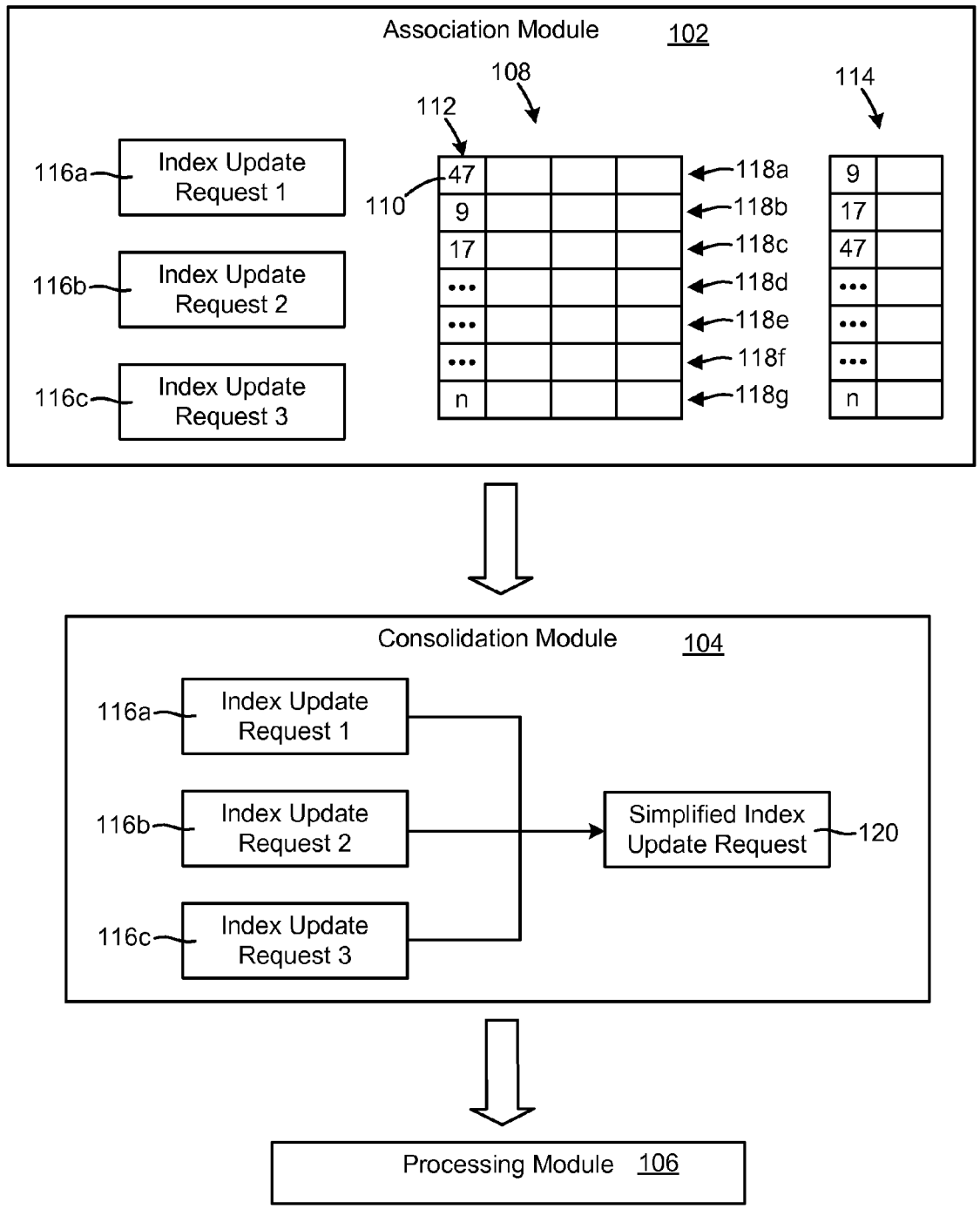
FIG. 1 is a schematic block diagram of an apparatus to streamline index updates in a shared-nothing architecture in accordance with embodiments of the present invention.

It will be readily understood that the components of the present invention, as generally described and illustrated in the FIGS. herein, may be arranged and designed in a wide variety of different configurations. Thus, the following more detailed description of the embodiments of the apparatus, system, and method of the present invention, as presented in the FIGS., is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, user interfaces, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Embodiments of the present invention teach an apparatus and method to streamline updates to an index associated with a data table in a shared-nothing architecture. As used herein, the term "shared-nothing" refers to a distributed computing architecture where each node is independent and self-sufficient, without the need to directly share memory or disk access. The term "index key" or "index key code" refers to a particular column on which an index for a database table is at least partially defined.

FIG. 1 broadly illustrates one embodiment of an apparatus 100 to streamline index updates associated with a data table in a shared-nothing architecture. In this type of architecture, one or more databases (not shown) may be partitioned into various database partitions or nodes (not shown). These partitions may be stored and managed on separate servers of the shared-nothing system to enable parallel database searches with reduced query times. Individual servers in the shared-nothing system may communicate with each other over a high-speed, low latency network, such as a system area network ("SAN").

In some embodiments, databases may present data as a collection of database tables 108, where each table 108 includes a defined number of columns, or index keys 112, and rows 110. One or more indexes 114 may be associated with a table 108 to facilitate efficient access to rows 110 therein. Where data is redistributed, added, or removed from a database table 108, an associated index 114 must be updated to reflect such change.

An apparatus 100 to streamline index updates in accordance with the present invention may include an association module 102, a consolidation module 104, and a processing module 106. The association module 102 may associate index update requests 116 with a particular index 114 associated with a database table 108. An index 114 may be defined by a particular column or index key 112, or ordered collection thereof. As shown in FIG. 1, the association module 102 may identify a column or index key 112 common to one or more index update requests 116*a-c*. The association module 102 may then use this index key 112 to associate such index update requests 116*a-c* with an index 114 defined thereby.

The consolidation module 104 may compile a group of index update requests 116 affecting the index 114 prior to processing. Index update requests 116 may be compiled by the consolidation module 104 as they are received. Groups of compiled index update requests 116 may then be forwarded to a processing module 106 for processing, as discussed in more detail below. In some embodiments, the consolidation module 104 may order the index update requests 116 according to their associated index key code 112, such that index update requests 116 associated with a most significant index key code 112 are forwarded to the processing module 106 first.

In certain embodiments, the consolidation module 104 may further aggregate index update requests 116*a*, 116*c* having a common index key value 110, identifying a common record 110, to simplify later processing. For example, one index update request 116*a* may be configured to update the index 114 to reflect a transfer of a record 110, defined by a particular index key value 110, from a first position 118*a* in the table 108 to a second position 118*d* in the table 108. Another index update request 116*c* may be configured to update the index 114 to reflect a transfer of the record 110 from the second position 118*d* in the table 108 to a third position 118*g* in the table 108.

The consolidation module 104 may consolidate the index update requests 116*a*, 116*c* into a simplified index update request 120. The simplified index update request 120 may be configured to update the index 114 to reflect a transfer of the record 110 directly from the first position 118*a* in the table 108 to the third position 118*g* in the table 108. Likewise, in embodiments where a record 110 is moved from a first position 118*a* in the table 108 to a second position 118*d* in the table 108, and then deleted from the second position 118*d*, the consolidation module 104 may convert the operations into a single delete at the first position 118*a* in the table 108.

In one embodiment, the consolidation module 104 collects index update requests 116 from a memory buffer (not shown) shared by more than one partition. Each index update request 116 may include an index key code 112, an index key value 110 to identify a particular record 110, and an operation code (not shown). The operation code may be either "add" or "delete." The operation code "add" instructs the processing module 106 to add the index key code 112 to the index 114, while the operation code "delete" instructs the processing module 106 to delete the index key code 112 from the index 114. If both "add" and "delete" operation codes are found for the same index key value 110, the consolidation module 104 may convert the operation codes to a single "delete" to prevent the index key code 112 from being written to the index 114.

In this manner, embodiments of the present invention that consolidate index update requests 116 into simplified index update requests 120 may facilitate the reuse of free space without requiring an extra table scan, as is normally required where index update requests 116 affecting the same record 110 include operation codes that effectively cancel each other out.

The processing module 106 may receive the simplified index update requests 120 in addition to index update requests 116 having unique index key values 110, and thus not subject to consolidation. The processing module 106 may process the requests 120, 116 to apply the index updates accordingly. In certain embodiments, the processing module 106 may process the requests 120, 116 independently of other data to facilitate substantially continuous data processing.

In some cases, index update requests 116 sharing a common index key value 110 may be received out of order, such that the processing module 106 is unable to process the index update request 116*a*, 116*c*. For example, one thread may move a row from a first position "x" to a second position "y." A second thread may detect the row at position "y" and move it to position "z." If the index update request 116 to move the row from position "y" to position "z" is received before the index update request 116 to move the row from position "x" to position "y," the processor may be unable to be process the request. A similar situation may arise where a row is added to a new location and later deleted from that location. If the index update request 116 to delete the row from the new location is received before the row is added to that location, an error may result and the index update request 116 may not be processed.

In a previous example, for instance, more than one index update request 116*a*, 116*c* shares a common index key value 110, indicating that such index update requests 116*a*, 116*c* affect a common record 110. One of the index update requests 116*a* reflects a transfer of the record 110 from a first position 118*a* in the table 108 to a second position 118*d* in the table 108, while another of the index update requests 116*c* reflects a transfer of the record 110 from the second position 118*d* in the table 108 to a third position 118*g* in the table.

Where the second index update request 116*c* is received before first index update request 116*a*, the processing module 106 may be unable to process the request 116*c* because the record 110 has not yet been moved to the second position 118*d*. In response, embodiments of the present invention may return the second update request 116*c* to the consolidation module 104 to await receipt of the first update request 116*a*. In this manner, embodiments of the present invention substantially guarantee proper ordering and implementation of index update requests 116.

Figure 2:
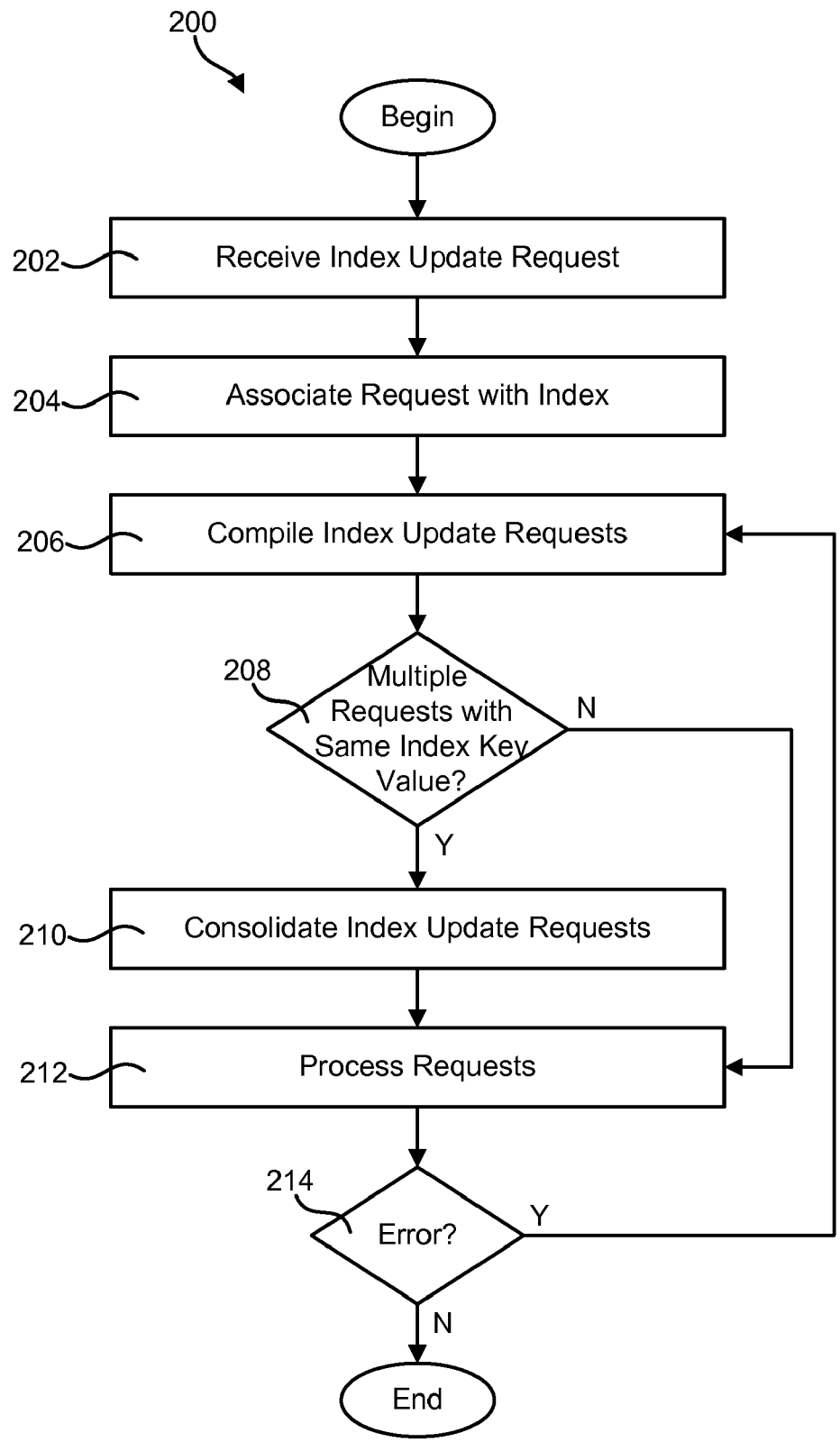
FIG. 2 is a flow chart illustrating one embodiment of a method to streamline index updates in accordance with the present invention.

Referring now to FIG. 2, a method 200 in accordance with certain embodiments of the present invention may include receiving 202 an index update requests and associating 204 the index update requests with an index. The index update requests may be configured to update an index to reflect a redistribution of data in a data table. An index update request may include an index key code associated with the data. Accordingly, the index key code may be used to associate the index update request with the index.

The index update requests may be compiled 206 prior to processing. In some embodiments, the index update requests may also be ordered based on an index key code associated therewith. At decision step 208, the compiled index update requests may be analyzed to determine whether multiple requests share a common index key value. If yes, such index update requests may be consolidated 210 to simplify later processing. Specifically, index update requests having a common index key value may be ordered and aggregated to create a simplified index update request. The simplified requests may then be processed 212 to apply the index updates to the index. If the compiled index update requests do not share a common index key value, the method 200 may proceed directly to processing 212 the requests to apply the index updates.

In some cases, such as where index update requests having a common index key value are received out of order, an error may be returned at decision step 214. The index update request may then be returned to be compiled 206 with other index update requests. In this manner, the present invention substantially guarantees proper ordering and processing of index update requests sharing a common index key value. Where no error is returned at decision step 214, the method 200 may end.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A microprocessor to streamline updates to an index associated with a data table in a shared-nothing architecture, the data table having been distributed to an independent partition within the shared-nothing architecture, the apparatus comprising:

an association module to associate each of a plurality of index update requests with an index, each of the plurality of index update requests configured to update the index in response to a redistribution of data in a data table associated therewith, wherein each of the plurality of index update requests comprises an index key value to identify a record of the data table and an index key code to identify a column of the data table;

a consolidation module to group the plurality of index update requests prior to processing of the plurality of index update requests, the consolidation module consolidating the plurality of index update requests into a smaller number of simplified index update requests configured to achieve the same result, wherein the consolidation module further orders each of the plurality of index update requests according to the index key code associated therewith, wherein the simplified index update requests facilitate reuse of table space without requiring a full table scan, the table space resulting from a first index update request to add an index key code to the index and a second index update request to delete the index key code from the index, wherein the first and second index update requests have a same index key value; and a processing module of the microprocessor to independently process the simplified index update requests in order from a most significant index key code to a least significant index key code associated therewith and update the index accordingly.

2. A computer program product comprising a computer-useable medium storing a computer-readable program for streamlining updates to an index associated with a data table in a shared-nothing architecture, the operations of the computer program product comprising:

receiving a plurality of index update requests configured to update an index in response to a redistribution of data in a data table associated therewith;

associating the plurality of index update requests with the index;

grouping the plurality of index update requests prior to processing of the plurality of index update requests;

consolidating the plurality of index update requests into a smaller number of simplified index update requests configured to achieve the same result, wherein consolidating the plurality of index update requests comprises facilitating reuse of table space without requiring a full table scan, the table space resulting from a first index update request to add an index key code to the index and a second index update request to delete the index key code from the index, wherein the first and second index update requests have a same index key value;

ordering the index update requests from a most significant request to a least significant request based on an index key code associated therewith; and independently processing the simplified index update requests in order to update the index.

* * * * *